United States Patent
Waerp et al.

(10) Patent No.: US 7,770,482 B2
(45) Date of Patent: Aug. 10, 2010

(54) METHOD FOR CONTROLLING A GEAR-SHIFTING PROCESS IN A MANUAL TRANSMISSION WITH ACTIVE INTERLOCK

(75) Inventors: Ole Jonny Waerp, Kongsberg (NO); Viggo L. Norum, Kongsberg (NO); Jan Gunnar Royland, Kongsberg (NO); Lars Lein, Kongsberg (NO); Christer Svenkerud, Kongsberg (NO)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 86 days.

(21) Appl. No.: 11/901,440

(22) Filed: Sep. 17, 2007

(65) Prior Publication Data
US 2008/0105075 A1 May 8, 2008

Related U.S. Application Data

(63) Continuation of application No. PCT/DE2006/000426, filed on Mar. 9, 2006.

(30) Foreign Application Priority Data
Mar. 16, 2005 (DE) .................. 10 2005 012 032

(51) Int. Cl.
- *F16H 59/00* (2006.01)
- *F16H 61/00* (2006.01)
- *F16H 63/00* (2006.01)

(52) U.S. Cl. .................. 74/337.5; 74/335; 477/906

(58) Field of Classification Search .................. 74/335, 74/337.5, 473.11, 473.12, 473.24, 473.36, 74/471 XY, 479.01; 477/906

See application file for complete search history.

(56) References Cited

U.S. PATENT DOCUMENTS

| | | | | |
|---|---|---|---|---|
| 5,281,902 | A * | 1/1994 | Edelen et al. | 318/632 |
| 5,970,815 | A * | 10/1999 | Buerger | 74/473.24 |
| 7,313,979 | B2 * | 1/2008 | Ehrlich et al. | 74/335 |
| 7,398,706 | B2 * | 7/2008 | Pollak et al. | 74/473.36 |
| 7,448,291 | B2 * | 11/2008 | Stengel et al. | 74/335 |
| 2005/0103145 | A1 | 5/2005 | Pollak et al. | |

FOREIGN PATENT DOCUMENTS

| | | |
|---|---|---|
| DE | 103 16 444 A1 | 10/2003 |
| DE | 103 10 831 | 11/2003 |
| WO | WO 03/087635 A1 | 10/2003 |

* cited by examiner

*Primary Examiner*—David D Le
(74) *Attorney, Agent, or Firm*—Davidson, Davidson & Kappel, LLC

(57) ABSTRACT

A method for controlling a gear-shifting process from an initial gear to a target gear in a manual transmission with active interlock. According to the method, the active interlock gear-shifting mechanism includes at least one shifting finger which co-operates with a selector fork, and has a layout geometry including a finger and a cam. The method contains the following steps: the selector fork of the initial gear is brought into a reliable shifting position by a method for compensating errors on the gear shifting mechanism, and/or the selector fork of the target gear is brought into a reliable shifting position a method for compensating errors on the gear shifting mechanism, before the target gear is engaged, when ever a temporarily non-critical gear-shift is to be carried out.

8 Claims, 4 Drawing Sheets

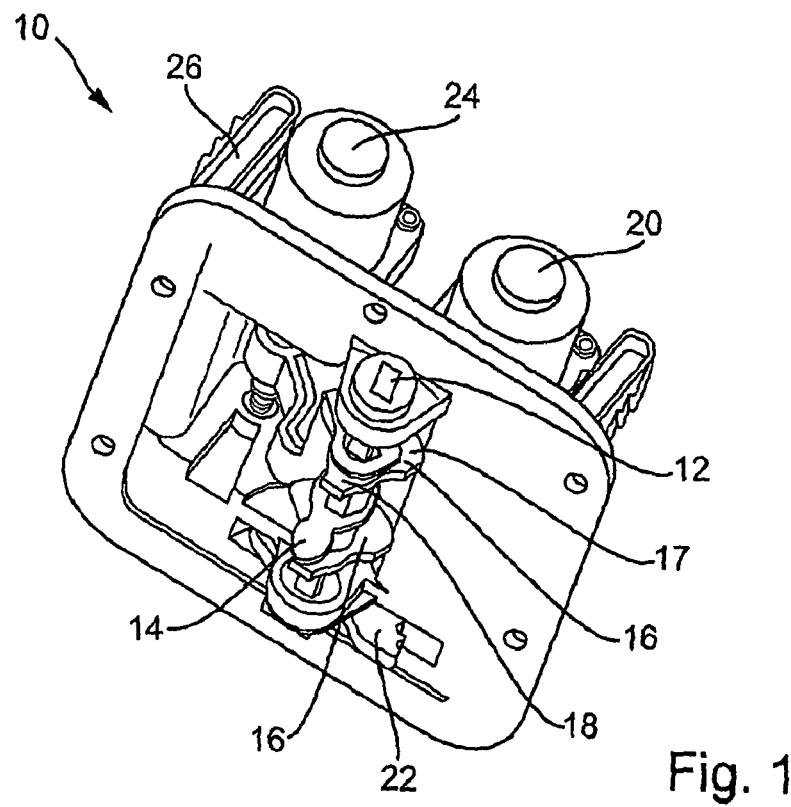
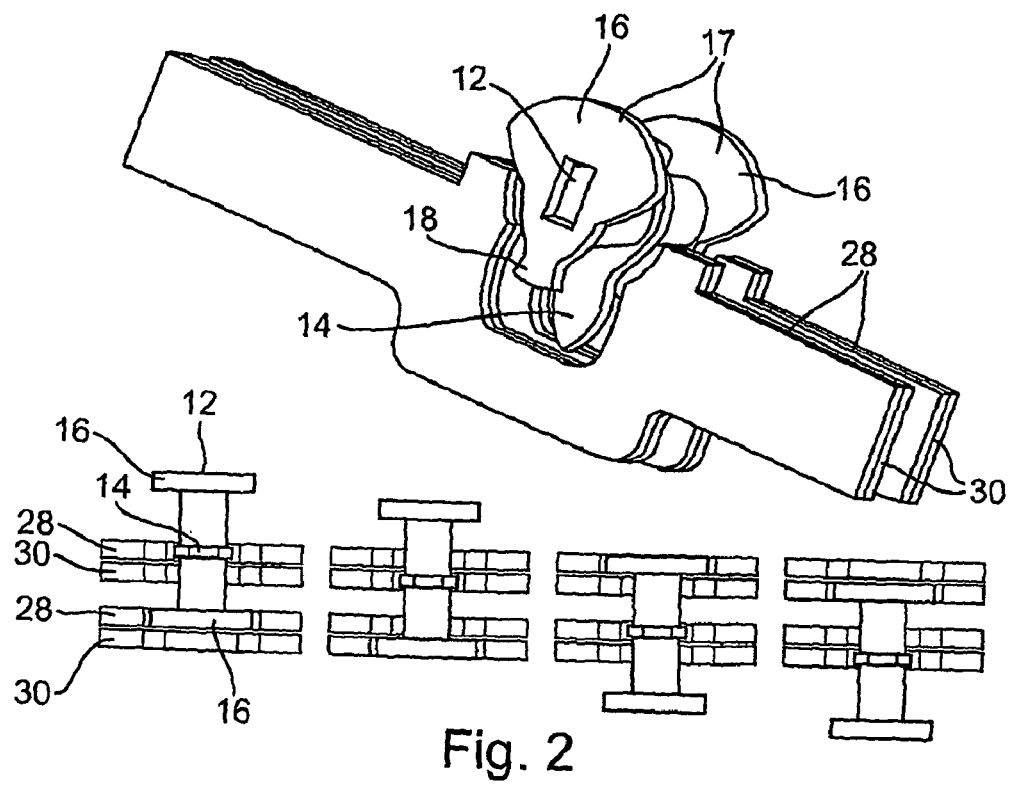
Fig. 1
Fig. 2

METHOD FOR CONTROLLING A GEAR-SHIFTING PROCESS IN A MANUAL TRANSMISSION WITH ACTIVE INTERLOCK

This application is a continuation of prior International Application PCT/DE2006/000426, filed Mar. 9, 2006, which is hereby incorporated by reference herein.

The invention relates to a method for controlling a gear-shifting process from an initial gear to a target gear in a manual transmission, which has a so called active interlock shifting mechanism.

BACKGROUND

In a regular transmission, thus a manual transmission, or an automatic transmission, the actions "lay gear out"; "select" and "shift gear" take place in this predetermined sequence. In a transmission, comprising an active interlock shifting mechanism, the functions of laying the gear out, and shifting the gear, are performed through different structural components, in particular, shifting is performed through shifting fingers, which are only being used for shifting the gears. The laying out is performed through layout geometries, in turn, comprise a layout finger and a layout cam, moving the shifting rod, depending on the shifting process. The shifting geometry, this means the shifting fingers, and the layout geometry, are separate components, so that the selection movement for the target gear can be performed before the layout movement of the initial gear performed.

Thus, in an active interlock shifting mechanism, the shifting finger can be moved back into the middle position, when a gear is shifted, without laying out the current initial gear. Thus, the new gear can be selected, before the old gear is laid out. In all shift alleys, in which the shifting finger is not positioned, a layout geometry operates to lay out the initial gear. It lays out the initial gear directly prior to a new gear being shifted by the shifting finger. Thereby, the shifting finger and the layout geometry are geometrically associated by design, so that an active gear lock is provided, so that a target gear cannot be shifted, before the initial gear is laid out.

Shifting systems with active interlock generally comprise error recognition systems, which cause a control system for an automated transmission to bring the transmission into a safe state through mechanisms, which are not influenced by the detected error, this means into a state, which is not dangerous for the respective driving condition, and which possibly avoids damages to the transmission. Such occurring errors can be a broken or damaged shifting finger, a broken or damaged layout mechanism, in particular, a broken or damaged layout cam, or other mostly mechanical failures of the gear-shifting mechanism. Furthermore, the errors can relate to test functions, which are being performed, in order to detect the safe shifting of a target gear, or the return of shifting mechanism elements into their initial positions.

Conditions can be problematic, however, in which a failure at an element of the shifting mechanism has e.g. occurred, which, however, has not been detected yet by the transmission control system, so that an error handling mode of the transmission control system is not yet activated, and the control operates in error free operating mode, in spite of the present damage.

SUMMARY OF THE INVENTION

An object of the present invention provides a shifting method for a transmission with active interlock, in which it may be assured that a shifting position results from the shifting process, which is not critical for driving and for the transmission, even when a not yet detected error or damage is present at the shifting mechanism of the transmission.

A method for controlling a shifting process from an initial gear into a target gear in a transmission with active interlock, in which the active interlock shifting system comprises at least one shifting finger, cooperating with a selector fork, and a layout geometry with a layout finger and a layout cam, brings the selector fork of the initial gear into a safe shifting position through a shifting process, capable of compensating for errors in the shifting mechanism, and/or brings the selector fork of the target gear into a safe shifting position, through a shifting process, compensating for an error at the shifting mechanism, before the selected target gear is engaged. The process is always performed, when, and preferably only performed, when a time critical shifting process is present.

The invention is based on the idea, to guide the layout geometry, as well as the shifting finger, not directly into the target gear, but to initially bring it into a safe shifting position, this means, a shifting position, which is acceptable, when it remains selected instead of the initially selected gear, due to an error in the shifting mechanism, before the actual target gear is shifted. Thereby, it may be assured, that the transmission is in a safe, predetermined state, and not in a non predetermined state, when an error is present in the transmission, which has not yet been detected. A not yet detected error is an error, which the transmission control system has not detected yet. As soon as the error is detected, the function, according to the invention, is not responsible for transmission control anymore, but an error handling process activated by the control system. The present method constitutes a preventive measure in case the error has not been recognized yet. Since the preventive measures, which are being performed, so that the transmission ends in a safe state, when an error is present, which has not been detected yet, require time in addition to the normal shifting times, it is determined before the method according to the invention, if a time critical or a non time critical shifting process occurs. Only non time critical shifting processes, this means such, in which a delay due to the preventive measures does not matter, or is acceptable, are being performed with the preventive shifting measures.

Preferably, the safe gear, or the safe transmission position is the neutral position.

According to a preferred embodiment, the target gear is only shifted through shifting the shifting finger, which shifts the selector fork, when the error free reaching of the safe gear is detected in the safe gear via a testing process, and reported back to the transmission control system.

Preferably, shifting processes, which downshift, may be determined as time critical, so that the process is not performed in this case.

According to a preferred embodiment, a shifting process is considered a time critical shifting process, where the target gear is the neutral position and/or where the initial gear or the target gear is a reverse gear.

Preferably, also shifting processes from a lower initial gear into a higher target gear, i.e. up shifting processes, may be characterized as non time critical.

According to a preferred embodiment, the selector fork shifting a gear may be brought into a safe gear, when the target gear is "neutral", wherein the layout cam may be being used to bring the selector fork into the neutral position, the layout finger may be being used to bring the selector fork into the neutral position, and the shifting finger may be being used to bring the selector fork into the neutral position. Through the layout cam, as well as, the layout finger being used, to bring the selector fork of the initial gear into the neutral position, the selector fork reaches the neutral position, even when a problem is present at the shifting finger, or at the layout cam, or at the layout finger. Through the shifting finger being additionally used to bring the selector fork into the neutral position, a problem, which relates to the entire layout mechanism, is also being compensated.

Preferably, when the target gear is at the same selector fork, as the initial gear, the layout cam or the layout the finger is used, in order to bring the selector fork into the neutral position, and the shifting finger is being used, in order to bring the selector fork into the target gear. Thereby, a problem at the shifting finger is compensated, since the layout mechanism is used for moving the selector fork into the neutral position. Through the shifting finger being used for moving the selector fork into the target gear, the shifting finger remains in the safe position, this means, the neutral position, when the shifting finger is damaged.

According to a preferred embodiment, the shifting finger is being used, when the target gear is at another selector fork, than the initial gear, in order to bring the selector fork of the initial gear into the neutral position, and the shifting finger is also used to bring the selector fork for the target gear into the target gear. When a problem occurs at the layout mechanism, it is compensated by using the shifting finger for moving the selector fork into the neutral position. When there is an error at the shifting finger, the gear remains in neutral position, since the shifting finger is used to bring the selector fork into the target gear position.

Preferably, it is being examined, after shifting the target gear, if the target gear is shifted correctly, and if a deviation is detected, this is reported back to the transmission control system.

Thus it may be assured through the measures described above that the preventive safety functions assure that the selector fork ends in a safe position (neutral), instead of e.g. leaving the initial gear shifted, or being stuck in an intermediary state, when a not yet recognized error is present.

BRIEF DESCRIPTION OF THE DRAWINGS

Subsequently, the invention is described in an exemplary manner with reference to a shifting mechanism for a parallel shifting transmission with reference to the attached figures, in which:

FIG. 1 shows an active interlock shifting mechanism in a perspective view;

FIG. 2 shows an active interlock shifting mechanism for a parallel shifting transmission, with a shifting finger and two layout geometries, wherein both partial transmissions of a parallel shifting transmission are operated with one active interlock shifting mechanism;

DETAILED DESCRIPTION

Figure 3:
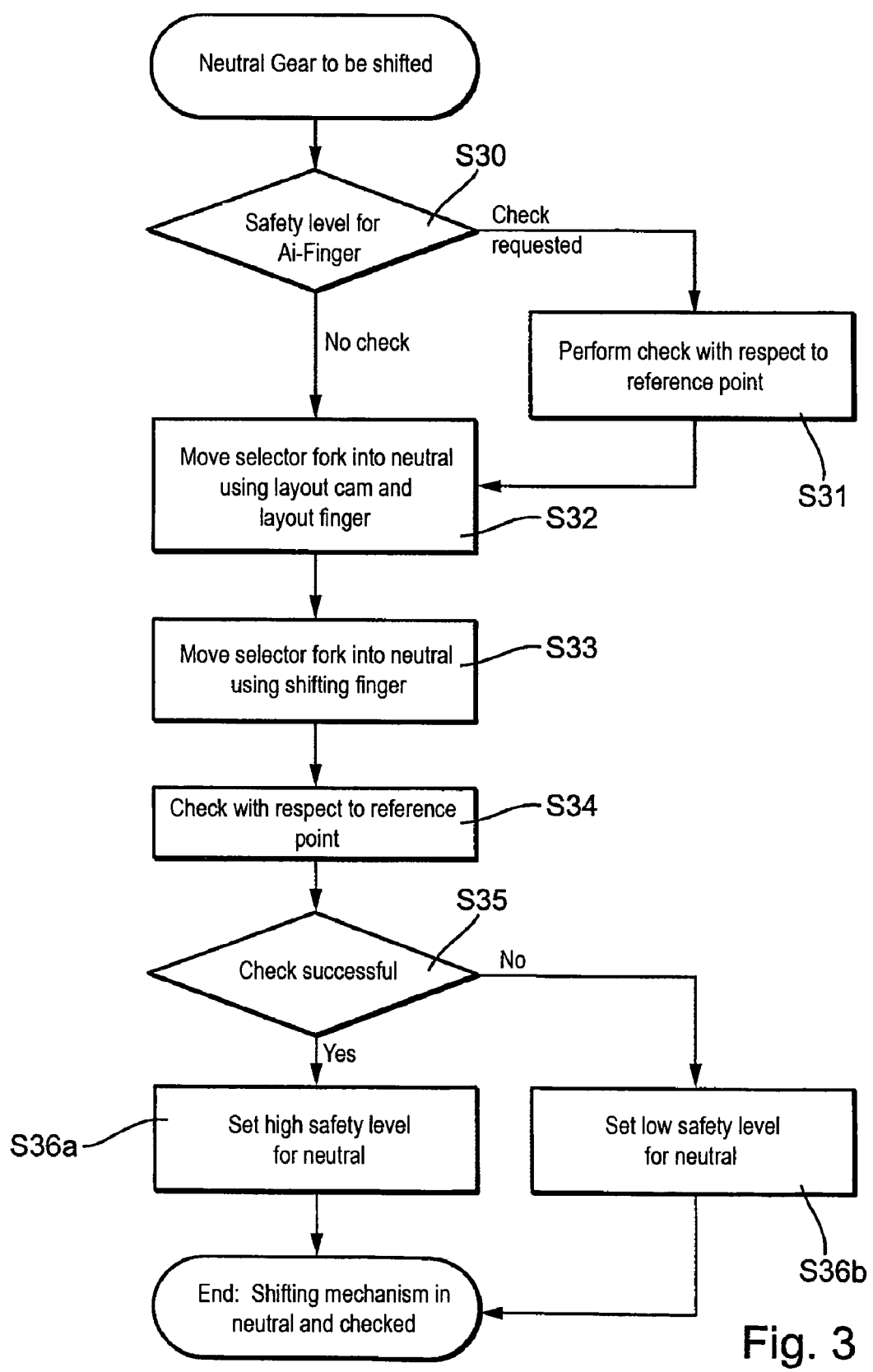
FIG. 3 is a flow diagram, showing the course of the process for the event, where the transmission shaft is to be brought into neutral position.

FIG. 1 shows an active interlock shifting mechanism 10, as it is used e.g. in rear wheel drive vehicles. The central shifting shaft 12 for the illustrated application comprises a shifting finger 14 and two layout geometries 16. The layout geometries 16 each have a cam shaped area 17, and a finger shaped area 18. The shifting finger 14 and the layout geometries 16 are moveable on the shifting shaft 12, and are being shifted on the rectangular shifting shaft 12 during the selection process. A motor, e.g. a brushless motor 20, drives the shifting shaft 12 through a gear mechanism and e.g. a gear segment 22. An additional motor, e.g. also a brushless motor 24, is provided, which serves as a selection motor and which drives a spindle, which moves the shifting fingers 14 and the layout geometries 16.

In FIG. 2, the shifting and selection processes through a shifting finger, and through two layout geometries 16 disposed on a common shifting shaft 12 are shown schematically. The shifting finger 14 is located between the two layout geometries 16, which are disposed at a distance according to the width of the alley. The shifting rods 28, 30, which are being moved through the shifting fingers, or the layout geometries, are provided, wherein two respective shifting rods form a gear group, for even gears or for odd gears. In each position of the shifting finger 14, a layout geometry 16 acts upon the other shifting rod of the same group. The shifting rods 28 form one group, the shifting rods 30 form another group. Since, it is initially caused through rotating the shifting shaft 12 for moving the shifting rod 28, 30 through the shifting finger 14, due to the geometry of the assembly, that the layout geometries 16 initially bring their associated shifting rods into a neutral position, it may be assured that within each group always only one gear is shifted. In a parallel shifting transmission, however, one respective gear of both groups can be shifted (an even or an odd gear) simultaneously. When a gear of a group is shifted or laid out, everything stays unchanged in the other group. When required, also several shifting fingers 14 can be provided, e.g. when larger distances occur between the shifting rods.

FIG. 2 shows four shifting conditions, wherein the shifting finger 14 respectively acts upon another shifting rod 28 or 30. The geometry of the shifting finger 14, or of the layout geometries 16 assure that the shifting rod 28 or 30, whose gear is supposed to be laid out, is shifted, before the gear to be shifted, this means the target gear, is shifted through the shifting finger 14. Depending on the operating direction, different sections 17 or 18 of a layout geometry act upon the respective shifting rod 28 or 30, in order to move the shifting rods into a neutral position.

Figure 4:
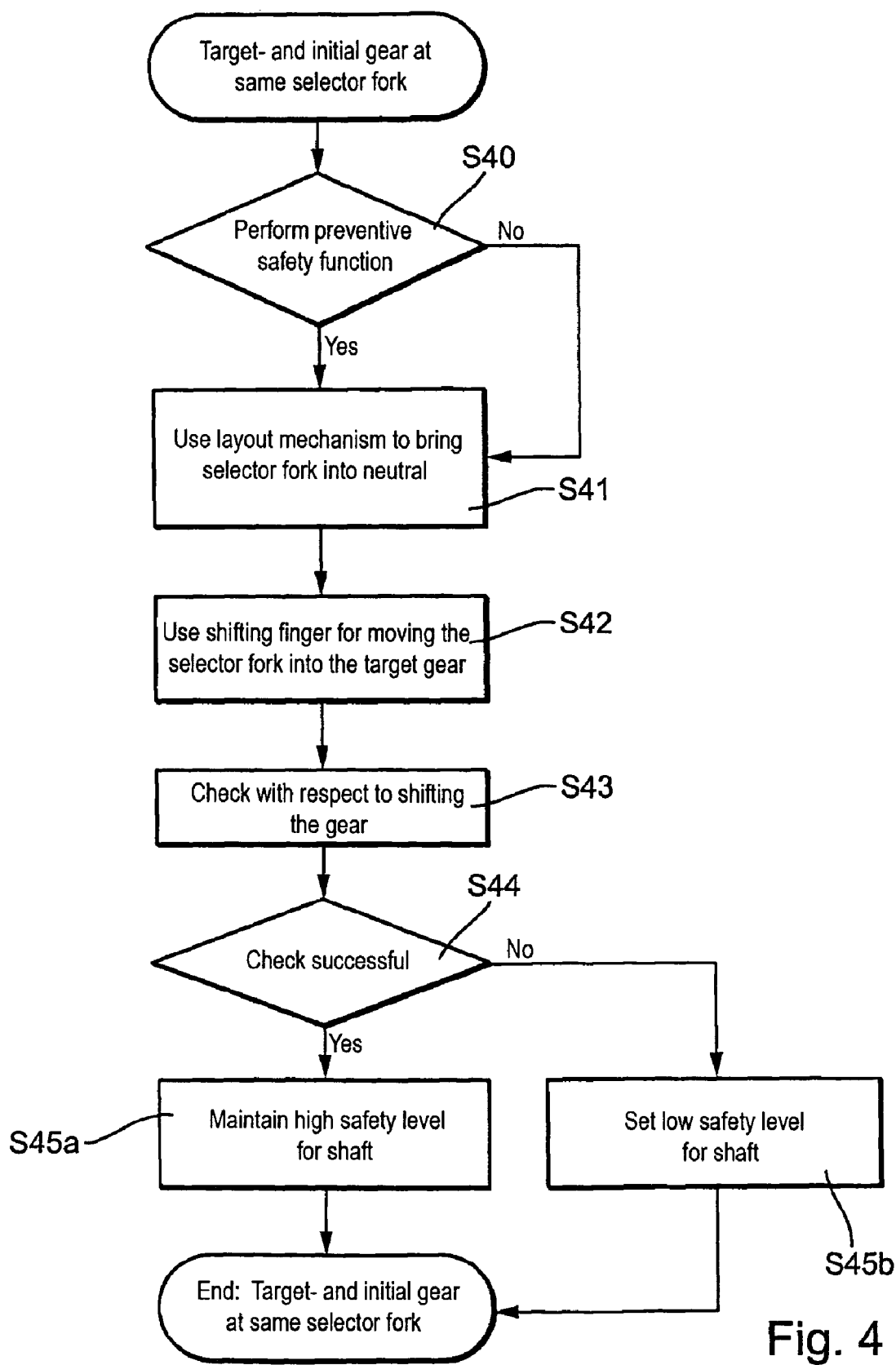
FIG. 4 is a flow diagram for the course of the process, where a target gear is to be shifted from an initial gear, when the selector fork for the target gear and the initial gear is the same.
Figure 5:
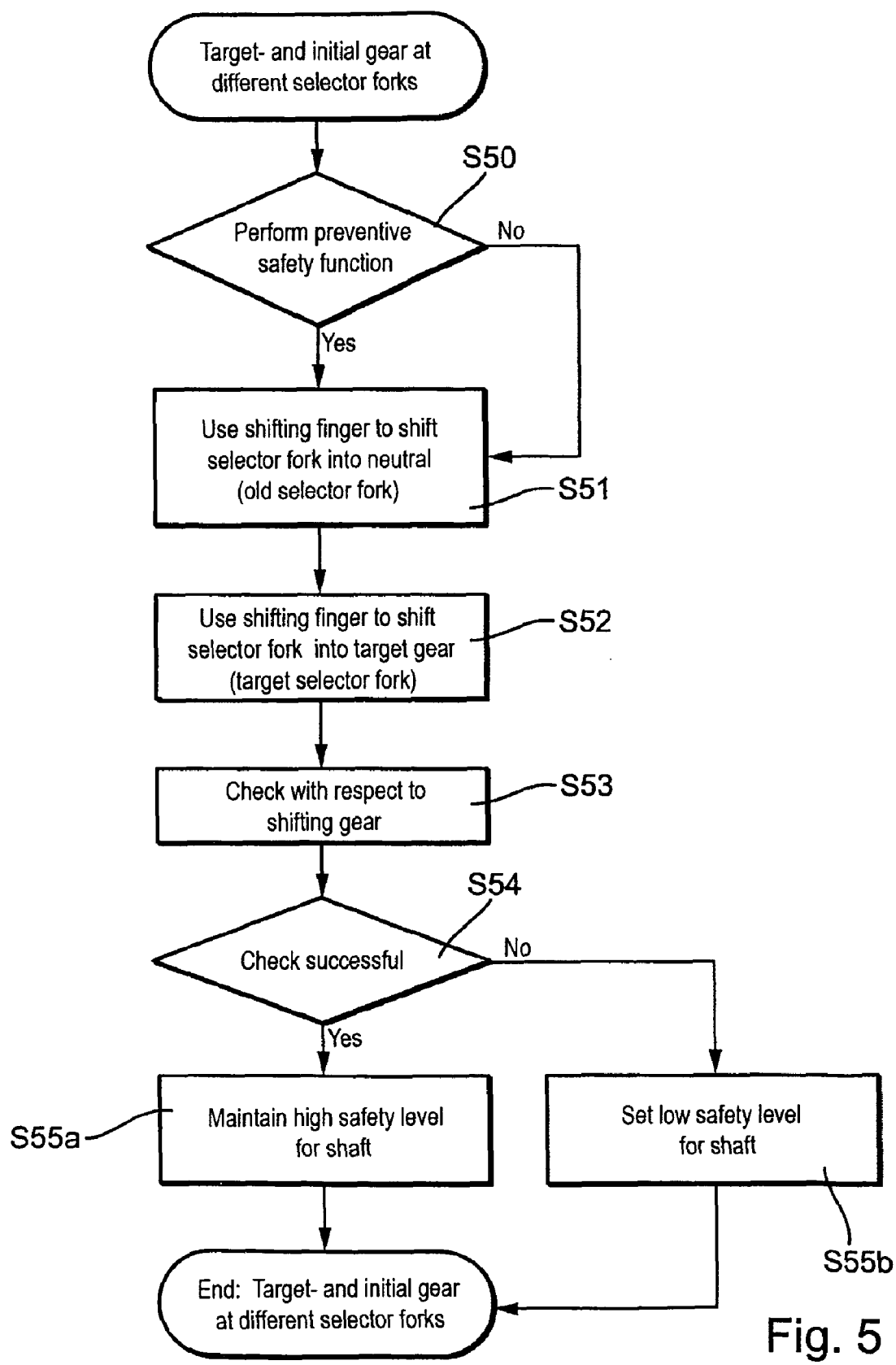
FIG. 5 is a flow diagram, which shows the course of the process in an exemplary manner, when the target gear and the initial gear are not at the same selector fork.

Subsequently, the method for reaching a safe gear condition is described with reference to FIGS. 3 through 5, independently of a respective, not yet detected, failure in the shifting mechanism of a shifting transmission with active interlock. Thus it is always assumed for controlling the layout geometry and the shifting finger that the gear, shifted at the shaft is known in the initial position and the selector fork for the shifted gear (initial gear) is shifted. FIG. 3 shows the method in the flow chart, when the neutral position is the target position, FIG. 4 shows the process, when the initial gear and the target gear are shifted with the same selector fork, and FIG. 5 shows the case where the target gear and the initial gear are shifted with different selector forks.

When the target position of the shifting process is the neutral position of the transmission, a transmission control system recognizes this, and determines that the preventive safety functions can be performed in the shifting process, since a shifting process is normally not time critical in neutral position, which means that the increased time, which is required for performing the preventive safety function, is acceptable. On the other hand, when the target gear is the neutral position, reaching this neutral position is often safety critical. In particular, no force in the drive train is acceptable, even for processes in which the clutch is only engaged for test purposes. Therefore, the shift control system detects, when the neutral position is the target position, preferably always a non time critical position, and performs the steps shown in FIG. 3.

It may be initially determined in step S30, if it is necessary, to test the shifting finger of the active interlock shifting mechanism with respect to its position. Thus e.g. an incremental distance measurement may be performed for detecting the position of the shifting finger.

When such a test process is necessary, it may be performed in step S31. Otherwise, when the position of the active interlock shifting finger is well known, the process goes to step S32, in which the selector fork of the initial gear is brought into neutral position. Thus, the layout geometry is being used, in particular, the layout cams, as well as the layout finger may be used, so that in case of a failure, or a damage, either of the layout cam, or the layout finger, the other element can still reliably move the selector fork into the neutral position. In case the shifting finger is damaged, the shifting finger may also be reliably brought into the neutral position through step S32, since the shifting finger is not being used.

Subsequently, in step S33, another process is performed, in which the selector fork is moved to "neutral", if it has not reached this status yet, since the shifting finger is moved here, so that it would move the selector fork to "neutral" itself. Thus, should the layout geometry have failed in step S32, the selector fork still reliably reaches the neutral position. Thus, three different mechanisms are used in step S32 and S33, in order to bring the selector fork from the initial gear into the neutral position. A failure of one, or even two mechanisms can thus be compensated, and the selector fork still reliably reaches the neutral position. A failure or damage of the entire layout geometry as well as of the shifting finger simultaneously is hardly probable, in particular, because no previous failure has been recognized in this case.

In step S34, eventually a test with reference to the reached reference point of the selector fork is performed, in order to assure that the selection and shift position is good, this means, precisely positioned. In case the neutral position is not achieved completely, or in an erroneous manner, this is detected in step S34. Therefore, e.g. position measurements for the selection and shift process are being performed, this means, performed separately for the two directions.

When the test from step S34 is successful, it may be detected in the shifting mechanism that the neutral position is reached reliably, and there is a high probability that no failure in the shifting mechanism has occurred (steps S35, S36a). Otherwise, a lower safety level is determined in step S36b, and an error management is performed accordingly.

When a shifting process is to be performed, in which the target and the initial gear are located at the same selector fork, this means, they are shifted with the same selector fork, a process according to FIG. 4 is performed. Thereby, it is initially determined in step S40, if the preventive safety function is to be performed or not. Thereby, it is generally true, that in a change of the driving direction, this means, a shift process into or out of the reverse gear, a non time critical shifting process occurs, so that, in this case, the determination in step S40 may be such, that the preventive safety function is to be performed. Shifting processes, in which the target gear and the initial gear are located at the same selector fork, and no reversal of the driving direction occurs, are rare, considering that the shifting mechanism is configured, so that subsequent gears, e.g. first gear and third gear, are located at different selector forks. Thereby, the block diagram, illustrated in FIG. 4, especially relates to shifting processes with a reversal of the driving direction. However, the determination in step S40 can be "yes", when the vehicle moves, but the shift time is not time critical, e.g. in up shifting processes, from first gear into fifth gear, wherein undetected errors are more severe in this case, since the possibility exists, that the clutch overspends. Thus the determination in step S40 is preferably "yes", also when the target and initial gear are located at the same selector fork, and an up shift process is performed.

Typically, the shifting finger shifts the selector fork for laying the old gear out, and for shifting the target gear, when the target gear is to be shifted with the same selector fork, as the initial gear. This means that in case of a failure of the shifting finger, the shaft stays in the old gear in this case, which can be safety critical.

Therefore, when it is determined in step S40, that the preventive safety function shall be performed, the layout mechanism uses the active interlock shifting mechanism, in order to bring the selector fork into "neutral" (step S41). Thereby, "neutral" forms the safe shifting position. Only subsequently, as it occurs also without a preventive safety feature, the shifting finger is being used in step S42 to shift the selector fork into the target gear. Thus it is avoided, that the target gear remains shifted in case of an erroneous shifting finger. If the shifting finger is damaged, the selector fork remains in the neutral position in step S42 in this case, so that no erroneous gear is shifted, and the shifting position remains predictable.

In the subsequent steps S43, S44 it is determined, if the target gear is correctly shifted, and it is determined, when the gear is not correctly shifted, which can, in turn, cause the determination of a lower safety level, and can be a cause for performing an error handling in step S45b. Otherwise, the high level of confidence that is placed in the shifting control system is maintained (step S45a).

When a time critical shift process (e.g. downshift process) is determined in step S40, then the method proceeds from step S40 directly to step S42.

FIG. 5 eventually shows the case, where the target and initial gear are located at different selector forks. Again, it is initially determined in step S50, if the preventive safety function is to be performed, or not. When the vehicle is at a standstill, preferably the preventive safety function is performed, since the shifting time is not time critical. When, on the other hand, the vehicle moves, the resulting synchronization force prevents shifting the target gear, when the layout mechanism fails, so that the error management system of the shifting control system recognizes this.

In case the preventive safety function is to be performed according to the determination in step S50, the shifting finger is used in step S51, in order to move the selector fork into the safe shifting position, this means, the neutral position. Thus it can be avoided that through using the shifting finger for shifting the selector fork into the target gear, two gears are shifted simultaneously, should the layout geometry fail. After the shifting finger was used for moving the selector fork into "neutral", the shifting finger is used for moving the selector fork into the target gear, as it is typical. Subsequently, as already explained in connection with FIG. 4, a check of the shifted gear is performed in the steps S53 through S55.

Thus, an aspect of the invention is that in non time critical shifting processes, the conventional shifting- or action sequence in the active interlock system is supplemented by a process that is performed before the target gear is shifted, by bringing the selector fork of the target gear into a safe shifting position, e.g. into the neutral position. This preferably also occurs in a redundant manner. Thus, it may be assured, in case of a failure of the layout geometry, or in case of a failure of the shifting finger for shifting the target gear, that the transmission remains in a safe condition.

DESIGNATIONS

10 Active interlock
12 Central shifting shaft
14 Shifting finger
16 Layout geometry
17 Cam shaped area
18 Finger shaped area
20 Brushless motor
22 Tooth segment
24 Brushless motor
26 Spindle
28 Shifting rod
30 Shifting rod

What is claimed is:

1. A method for controlling a shifting process from an initial gear into a target gear in a transmission with an active interlock shifting mechanism, the active interlock shifting mechanism including at least one shifting finger cooperating with a selector fork; and a disengaging geometry with a disengaging finger and a disengaging cam, the method comprising:

determining whether a time critical shifting process or a non time critical shifting process occurs; and bringing the selector fork of the target gear into a safe shifting position through a shifting method compensating for errors not yet detected by the transmission in the shifting mechanism before the target gear is shifted when the non time critical shifting process is to be performed, wherein the non time critical shifting process is determined when at least one of the target gear is the neutral position or the initial or the target gear is a reverse gear, wherein when the target gear is in a neutral position, the shifting method includes using the disengaging cam to bring the selector fork into the neutral position, using the disengaging finger to bring the selector fork into the neutral position, and using the shifting finger to bring the selector fork into the neutral position.

2. The method as recited in claim 1 wherein the safe shifting position is a neutral position.

3. The method as recited in claim 1 further comprising shifting the target gear-after an error free-reaching of the safe shifting position is detected in the safe shifting position.

4. The method as recited in claim 1 wherein downshifting processes from a higher initial gear into a lower target gear are determined as time critical.

5. The method as recited in claim 1 wherein after shifting the target gear a check is performed to determine if the target gear is shifted correctly.

6. The method as recited in claim 1 wherein the non time critical shifting processes further comprises from a lower initial gear into a higher target gear.

7. A method for controlling a shifting process from an initial gear into a target gear in a transmission with an active interlock shifting mechanism, the active interlock shifting mechanism including at least one shifting finger cooperating with a selector fork, and a disengaging geometry with a disengaging finger and a disengaging cam, the method comprising:

determining whether a time critical shifting process or a non time critical shifting process occurs; and bringing the selector fork of the target gear into a safe shifting position through a shifting method compensating for errors not yet detected by the transmission in the shifting mechanism before the target gear is shifted when the non time critical shifting process is to be performed, wherein the non time critical shifting process is determined when at least one of the target gear is the neutral position or the initial or the target gear is a reverse gear, wherein when the target gear is located at another selector fork than the initial gear, the shifting method includes using the shifting finger to bring the selector fork of the initial gear into the neutral position, and using the shifting finger to bring the selector fork for the target gear into the target gear.

8. A method for controlling a shifting process from an initial gear into a target gear in a transmission with an active interlock shifting mechanism, the active interlock shifting mechanism including at least one shifting finger cooperating with a selector fork, and a disengaging geometry with a disengaging finger and a disengaging cam, the method comprising:

determining whether a time critical shifting process or a non time critical shifting process occurs; and bringing the selector fork of the target gear into a safe shifting position through a shifting method compensating for errors not yet detected by the transmission in the shifting mechanism before the target gear is shifted when the non time critical shifting process is to be performed, wherein the non time critical shifting process is determined when at least one of the target gear is the neutral position or the initial or the target gear is a reverse gear, wherein when the target gear is at the same selector fork as the initial gear the shifting method includes using the disengaging cam or the disengaging finger to bring the selector fork into the neutral position, and using the shifting finger to bring the selector fork into the target gear.

* * * * *